United States Patent
Yang

(10) Patent No.: US 7,971,922 B2
(45) Date of Patent: Jul. 5, 2011

(54) FUEL FILLER HOUSING AND QUARTER INNER PANEL FOR VEHICLE

(75) Inventor: Young Moon Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 153 days.

(21) Appl. No.: 12/336,145

(22) Filed: Dec. 16, 2008

(65) Prior Publication Data
US 2009/0267380 A1 Oct. 29, 2009

(30) Foreign Application Priority Data
Apr. 25, 2008 (KR) .................. 10-2008-0038890

(51) Int. Cl.
*B60K 15/05* (2006.01)
(52) U.S. Cl. .................... 296/97.22; 296/198
(58) Field of Classification Search ............... 296/87.22, 296/29, 198; 220/86.2
See application file for complete search history.

(56) References Cited

U.S. PATENT DOCUMENTS

| | | | |
|---|---|---|---|
| 5,772,062 A * | 6/1998 | Gramss | 220/829 |
| 6,033,006 A * | 3/2000 | Bovellan et al. | 296/97.22 |
| 6,595,033 B1 * | 7/2003 | Hara et al. | 70/370 |
| 6,666,238 B1 * | 12/2003 | Crowley et al. | 141/286 |
| 6,722,407 B2 * | 4/2004 | Henry | 141/350 |
| 7,311,348 B1 * | 12/2007 | Bang | 296/97.22 |
| 7,487,807 B2 * | 2/2009 | Bender et al. | 141/95 |
| 7,740,301 B2 * | 6/2010 | Hirano | 296/97.22 |
| 2009/0189410 A1 * | 7/2009 | Gurtatowski et al. | 296/97.22 |
| 2009/0217503 A1 * | 9/2009 | Scott et al. | 29/428 |

FOREIGN PATENT DOCUMENTS

| | | |
|---|---|---|
| JP | 59-045221 | 3/1984 |
| JP | 2003-139110 | 5/2003 |
| KR | 1020000041777 A | 7/2000 |
| KR | 1020050101965 A | 10/2005 |

* cited by examiner

*Primary Examiner* — Jason S Morrow
(74) *Attorney, Agent, or Firm* — Morgan, Lewis & Bockius LLP

(57) ABSTRACT

A fuel filler housing and quarter inner panel for a vehicle may include a quarter inner panel portion including an opening hole for filling fuel and at least an inserting hole formed to be spaced outwardly from the opening hole, and a fuel filler housing portion including a filling hole communicating with the opening hole of the quarter inner panel portion and at least a latching port formed to be spaced outwardly from the filling hole to be inserted into the corresponding inserting holes of the quarter inner panel portion, wherein the fuel filler housing portion can be guided and fixed to the quarter inner panel portion by the inserting holes and the latching ports thereof when mounted.

12 Claims, 2 Drawing Sheets

FUEL FILLER HOUSING AND QUARTER INNER PANEL FOR VEHICLE

CROSS-REFERENCE TO RELATED APPLICATION

The present application claims priority to Korean Patent Application Number 10-2008-0038890 filed Apr. 25, 2008, the entire contents of which application is incorporated herein for all purposes by this reference.

BACKGROUND OF THE INVENTION

1. Field of the Invention

The present invention relates to a fuel filler housing and quarter inner panel for a vehicle, wherein structures of a fuel filler housing portion and a quarter inner panel portion are modified to allow the fuel filler housing portion to be stably mounted on the quarter inner panel portion without quality deviation.

2. Description of Related Art

In general, a vehicle is provided with a fuel tank so as to store fuel to be consumed for operating engine and all kinds of fuel hoses and pipes so as to transfer fuel pumped by a fuel pump to the engine at the lower portion and one side thereof.

Currently, the capacity and shape of the fuel tank are appropriately designed in accordance with each vehicle, and a lubricator hose is inserted into an opening hole of a fuel filler housing welded to a quarter inner panel for a vehicle to fill fuel into the fuel tank.

In addition, when the conventional fuel filler housing is mounted on the quarter inner panel by an operator, the fuel filler housing has been installed to be spaced from the quarter inner panel side by forceful contact to cause quality deviation. Therefore, a separate packing material formed of rubber for preventing the quality deviation has been installed therein to minimize such deviation.

However, the conventional method has a few problems such as an increasing cost and a slow working speed due to the additional installation of the packing material, and needs measures to prevent the quality deviation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fuel filler housing and quarter inner panel for a vehicle, in which structures of a fuel filler housing portion and a quarter inner panel portion are modified to prevent quality deviation which may be occurred when the fuel filler housing portion is mounted on the quarter inner panel portion, so that workability thereof can be improved and cost-effective production can be achieved.

In an aspect of the present invention, a fuel filler housing and quarter inner panel for a vehicle may include a quarter inner panel portion including an opening hole for filling fuel and at least an inserting hole formed to be spaced outwardly from the opening hole, and a fuel filler housing portion including a filling hole communicating with the opening hole of the quarter inner panel portion and at least a latching port formed to be spaced outwardly from the filling hole to be inserted into the corresponding inserting holes of the quarter inner panel portion, wherein the fuel filler housing portion can be guided and fixed to the quarter inner panel portion by the inserting holes and the latching ports thereof when mounted.

The inserting holes may be formed along the circumference of the opening hole.

An adhesive layer may be applied to a region spaced outwardly from the opening hole of the quarter inner panel portion to prevent quality deviation which may be occurred when the fuel filler housing portion is coupled to the quarter inner panel portion.

The adhesive layer may integrally enclose the opening hole.

The inserting hole of the quarter inner panel portion may be disposed inward the adhesive layer.

The inserting hole of the quarter inner panel portion may be disposed outward the adhesive layer.

The inserting hole of the quarter inner panel portion may have a slot-shaped hole.

The latching port of the fuel filler housing portion may have a bent portion so that the latching port is safely guided and fixed to the inserting hole when inserted thereto.

The bent portion of the latching port may be bent outward the latching portion with a predetermined angle.

An upper portion of the latching port which is disposed above a portion corresponding to the inserting hole when the latching port is coupled to the inserting hole may be bent with equal to or more than 90 degrees with respect to abutting surface of the quarter inner panel portion.

The bent portion of the latching port may be bent inward the latching portion with a predetermined angle.

An upper portion of the latching port which is disposed above a portion corresponding to the inserting hole when the latching port is coupled to the inserting hole may be bent with equal to or more than 90 degrees with respect to abutting surface of the quarter inner panel portion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
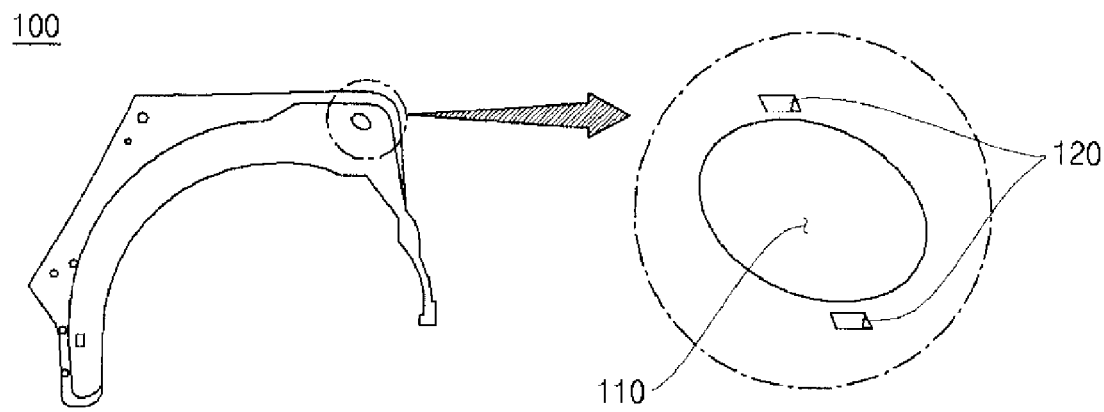
FIGS. 1a and 1b illustrate an exemplary fuel filler housing portion and quarter inner panel portion for a vehicle according to the present invention.
Figure 1B:
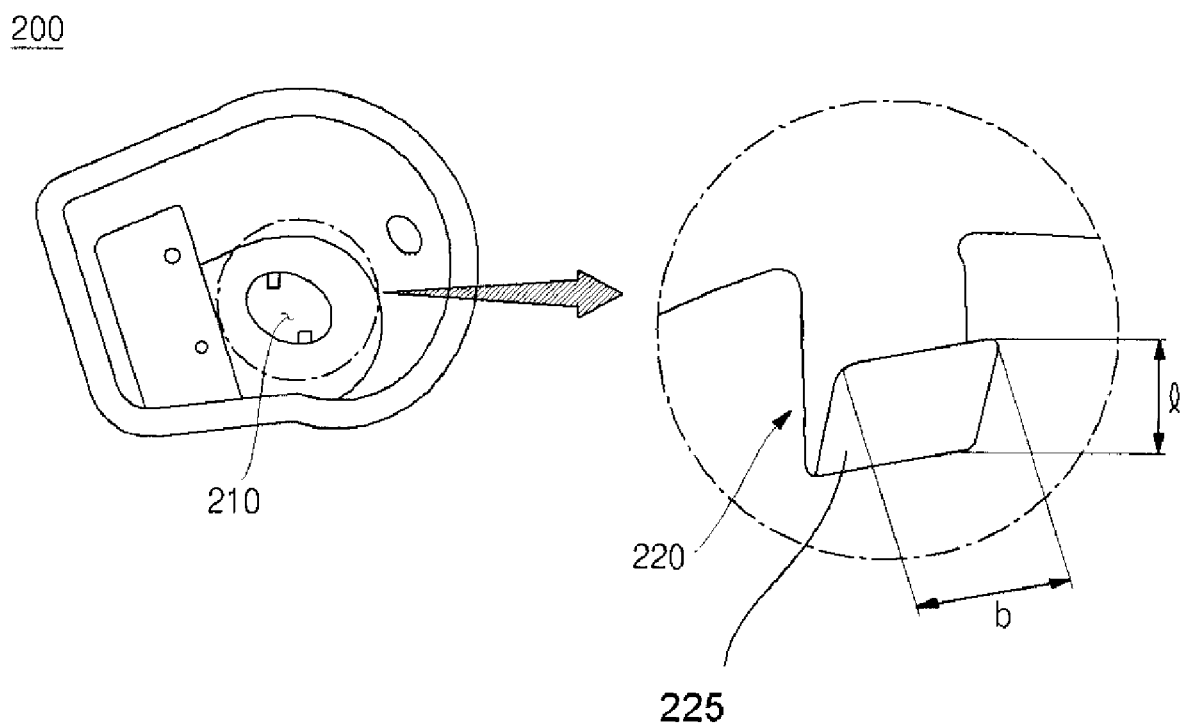
Figure 2:
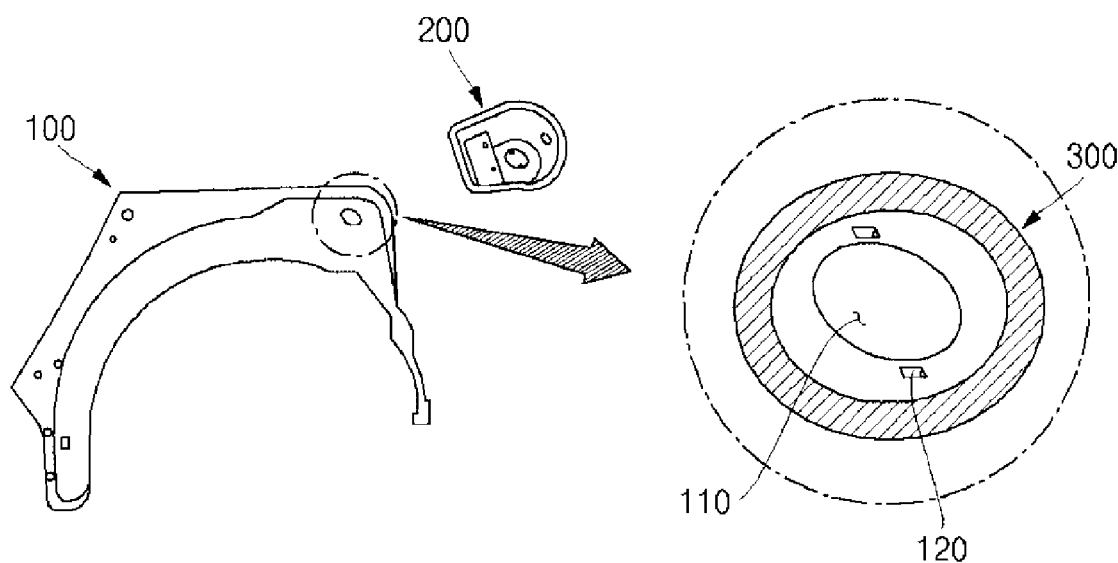
FIG. 2 illustrates an exemplary adhesive layer applied to the fuel filler housing portion and the quarter inner panel portion for a vehicle according to the present invention.
Figure 3:
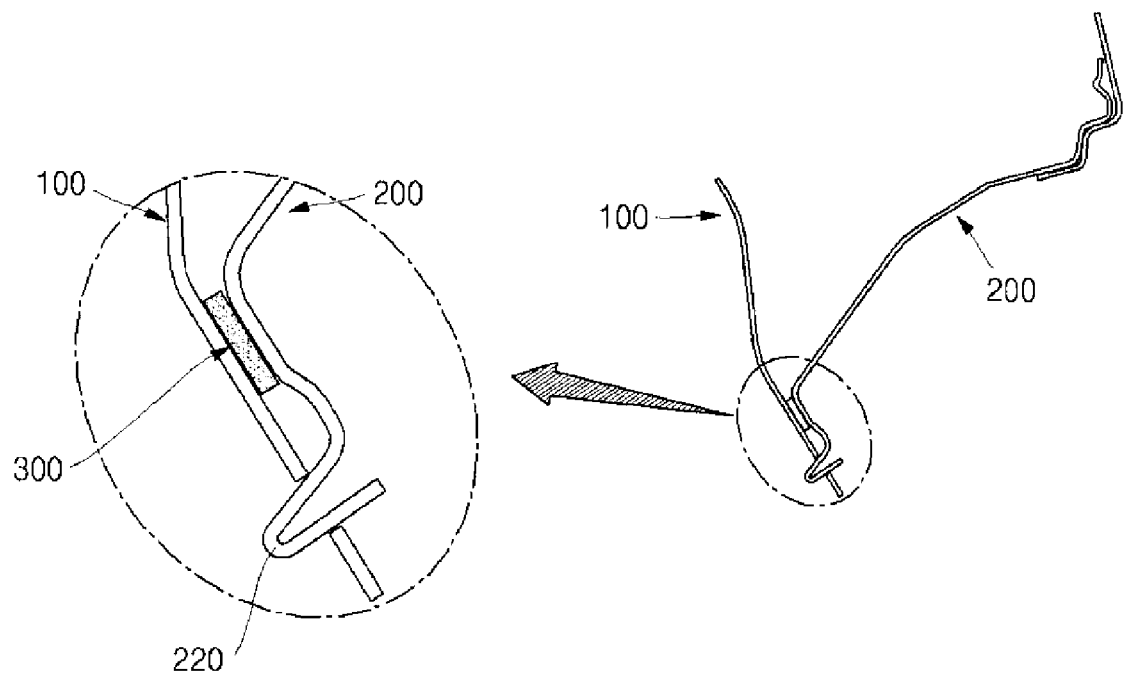
FIG. 3 illustrates an exemplary installed state of the fuel filler housing portion and the quarter inner panel portion for a vehicle according to the present invention.

FIGS. 1a and 1b illustrate a fuel filler housing portion and a quarter inner panel portion for a vehicle according to various embodiments of the present invention. FIG. 2 illustrates an adhesive layer applied to the fuel filler housing portion and the quarter inner panel portion for a vehicle according to various embodiments of the present invention. FIG. 3 illustrates an installed state of the fuel filler housing portion and the quarter inner panel portion for a vehicle according to various embodiments of the present invention.

Referring to FIGS. 1a and 1b, a fuel filler housing and quarter inner panel for a vehicle according to various embodiments of the present invention includes a quarter inner panel portion 100 consisting an opening hole 110 for filling fuel and a plurality of inserting holes 120 formed to be spaced outwardly from the opening hole 110; and a fuel filler housing portion 200 including a filling hole 210 communicating with the opening hole 110 of the quarter inner panel portion 100 and a latching port 220 formed on the circumference of the filling hole 210 to be inserted into the inserting hole 120 of the quarter inner panel portion 100, so that the fuel filler housing portion 200 can be guided and fixed to the quarter inner panel portion 100 when installed.

An adhesive layer 300 is applied to a region spaced outwardly from the inserting hole 120 of the quarter inner panel portion 100 according to various embodiments of the present invention to prevent quality deviation which may be occurred in an upper and lower direction when the fuel filler housing portion 200 is coupled to the quarter inner panel portion 100.

The inserting hole 120 of the quarter inner panel portion 100 according to various embodiments of the present invention has a slot-shaped hole.

The latching port 220 of the fuel filler housing portion 200 according to various embodiments of the present invention has one bent side in a longitudinal direction thereof so that the latching port 220 is stably guided and fixed to the inserting hole 120 when inserted.

The installed state of the fuel filler housing portion and the quarter inner panel portion for a vehicle according to various embodiments of the present invention featuring the constitution mentioned above will be described in detail with reference to the accompanying drawings.

Referring to the FIG. 2, the quarter inner panel portion 100 according to various embodiments of the present invention has an adhesive layer 300 with a predetermined width and thickness formed by applying adhesives to the outside surface of the inserting hole 120 by an operator.

Preferably, the adhesive layer 300 is, but not particularly limited, applied to be wider and thicker than the size of the filling hole 210 of the fuel filler housing portion 200 to be mounted on the opening hole 110 of the quarter inner panel portion 100.

Referring to FIG. 3, after the operator check whether the applied adhesive layer 300 is dried, the latching port 220 of the fuel filler housing portion 200 is inserted into the inserting hole 120 of the quarter inner panel portion 100.

As shown in FIG. 1a, the latching port 220 according to various embodiments of the present invention has a width corresponding to the length of "b" and a bending length corresponding to the length of "l", so that its own elastic restoring force generated around the bending region of the latching port 220 after it is inserted into the slot-shaped inserting hole 120 allows it to be supported elastically and coupled to the inner surface of the inserting hole 120.

The latching port 220 according to various embodiments of the present invention has a bent portion 225 that includes a stable bending length in an upper and lower direction outwardly from the inserting hole 120 so that they are prevented from being separated from each other after the latching port 220 is coupled to the inserting hole 120.

In various embodiments of the present invention, the bent portion 225 may be disposed in the latching port 220 and bent inwardly so that the latching port 220 can be coupled to the inserting hole 120.

In other embodiments of the present invention, an upper portion of the latching port 220 which is disposed above the portion corresponding to the inserting hole 120 may be bent with equal to or more than 90 degrees with respect to abutting surface of the quarter inner panel portion 100 so that the latching port 220 can be more firmly coupled to the inserting hole 120.

In still other embodiments of the present invention, the inserting hole 120 of the quarter inner panel portion 100 may be formed outward the adhesive layer 300, or inward and outward the adhesive layer 300 to prevent quality deviation which may be occurred in an upper and lower direction when the fuel filler housing portion 200 is coupled to the quarter inner panel portion 100.

As the fuel filler housing portion 200 is installed as described above, the applied adhesive layer 300 and the latching port 220 prevent such deviation so that the fuel filler housing portion 200 can be stably installed.

Furthermore, a lower side of the fuel filler housing portion 200 according to the present is in contact with an upper side of the adhesive layer 300 to prevent quality deviation which may be occurred in an upper and lower direction of the fuel filler housing portion 200, and the latching port 220 may prevent the fuel filler housing portion 200 from being separated or detached outwardly from the opening hole 110, so that the fuel filler housing portion 200 is safely mounted on the quarter inner panel portion 100.

As described above, the fuel filler housing and quarter inner panel for a vehicle according to various embodiments of the present invention can minimize such deviation occurred upon the installation of the fuel filler housing portion into the quarter inner panel portion, so that a welding operation is omitted to improve workability thereof and the cost is reduced to achieve cost-effective production.

For convenience in explanation and accurate definition in the appended claims, the terms, "upper", "lower", "outwardly" and "outside," are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A fuel filler housing and quarter inner panel for a vehicle comprising:

a quarter inner panel portion including an opening hole for filling fuel and inserting holes formed to be spaced outwardly from the opening hole; and a fuel filler housing portion including a filling hole communicating with the opening hole of the quarter inner panel portion and latching ports formed to be spaced outwardly from the filling hole to be inserted into the corresponding inserting holes of the quarter inner panel portion, wherein the fuel filler housing portion can be guided and fixed to the quarter inner panel portion by the inserting holes and the latching ports thereof when mounted; and wherein an adhesive layer is applied to a region spaced outwardly from the opening hole of the quarter inner panel portion to prevent quality deviation which may be occurred when the fuel filler housing portion is coupled to the quarter inner panel portion.

2. The fuel filler housing and quarter inner panel for a vehicle according to claim 1, wherein the inserting holes are formed along the circumference of the opening hole.

3. The fuel filler housing and quarter inner panel for a vehicle according to claim 1, wherein the adhesive layer integrally encloses the opening hole.

4. The fuel filler housing and quarter inner panel for a vehicle according to claim 1, wherein the inserting holes of the quarter inner panel portion are disposed inward the adhesive layer.

5. The fuel filler housing and quarter inner panel for a vehicle according to claim 1, wherein the inserting holes of the quarter inner panel portion are disposed outward the adhesive layer.

6. The fuel filler housing and quarter inner panel for a vehicle according to claim 1, wherein each of the inserting holes of the quarter inner panel portion has a slot-shaped hole.

7. The fuel filler housing and quarter inner panel for a vehicle according to claim 1, wherein each of the latching ports of the fuel filler housing portion has a bent portion so that the latching ports are safely guided and fixed to the inserting holes when inserted thereto.

8. The fuel filler housing and quarter inner panel for a vehicle according to claim 7, wherein the bent portion of each of the latching ports is bent outward the respective latching port with a predetermined angle.

9. The fuel filler housing and quarter inner panel for a vehicle according to claim 8, wherein an upper portion of each of the latching ports which are disposed above portions corresponding to the inserting holes when the latching ports are coupled to the inserting holes is bent with equal to or more than 90 degrees with respect to abutting surface of the quarter inner panel portion.

10. The fuel filler housing and quarter inner panel for a vehicle according to claim 7, wherein the bent portion of each of the latching ports is bent inward the respective latching port with a predetermined angle.

11. The fuel filler housing and quarter inner panel for a vehicle according to claim 10, wherein an upper portion of each of the latching ports which are disposed above portions corresponding to the inserting holes when the latching ports are coupled to the inserting holes is bent with equal to or more than 90 degrees with respect to abutting surface of the quarter inner panel portion.

12. A passenger vehicle comprising the fuel filler housing and quarter inner panel for a vehicle according to claim 1.

* * * * *